United States Patent [19]
Way

[11] Patent Number: 5,177,634
[45] Date of Patent: Jan. 5, 1993

[54] HIGH GAIN LIMITING ERBIUM-DOPED FIBER AMPLIFIER WITH WIDE DYNAMIC RANGE

[75] Inventor: Winston I. Way, Tinton Falls, N.J.

[73] Assignee: Bell Communications Research, Inc., Livingston, N.J.

[21] Appl. No.: 782,675

[22] Filed: Oct. 25, 1991

[51] Int. Cl.⁵ .............................. H01S 3/30; G02B 6/26
[52] U.S. Cl. ..................................... 359/341; 359/337; 359/339; 372/6; 372/31
[58] Field of Search ............... 359/174, 179, 337, 339, 359/341; 372/6, 11, 31, 97

[56] References Cited

U.S. PATENT DOCUMENTS

| | | | |
|---|---|---|---|
| 3,599,106 | 8/1971 | Snitzer | 359/339 |
| 3,636,473 | 1/1972 | Young | 372/31 |
| 4,782,517 | 11/1988 | Bernardis et al. | 379/201 |
| 4,979,234 | 12/1990 | Agrawal et al. | 359/179 |
| 5,027,079 | 6/1991 | Desurvire et al. | 359/337 |
| 5,050,949 | 9/1991 | Di Giovanni et al. | 359/341 |

OTHER PUBLICATIONS

W. I. Way et al., "High Gain Limiting Erbium-Doped Fibre Amplifier with Over 30 dB Dynamic Range", *Electronics Letters*, 31st Jan. 1991, vol. 27, No. 3, pp. 211–213.

W. I. Way et al., "Optical Power Limiting Amplifier and Its Applications in an SONET Self-Healing Ring Network", *Journal of Lightwave Technology*, vol. 10, No. 2, Feb. 1992, pp. 206–214.

W. I. Way et al., "Simultaneous Distribution of Multichannel Analog and Digital Video Channels to Multiple Terminals Using High-Density WDM and a Broad-Band-In-Line Erbium Doped Fiber Amplifier", *IEEE Photonics Technology Letters*, vol. 2, No. 9, Sep. 1990, pp. 665–668.

Gabla et al.; IEEE Photonics Technol. Lett., vol. 3, #1, pp. 56–58, Jan. 1991; Abst. only supplied.

Willner et al.; IEEE Photonics Technol. Lett., vol. 3, #3, pp. 259–261, Mar. 1991; Abst. Only Supplied.

Way et al.; Electron Lett., vol. 27, #3, pp. 211–213, Jan. 31, 1991; abst. only available.

Tahada et al.; Trans. Inst. Electron. Inf. Commun. Eng. B., vol. E73, #1, pp. 21–26, Jan. 1990; abst. only.

Primary Examiner—Nelson Moskowitz
Attorney, Agent, or Firm—Leonard Charles Suchyta; Stephen M. Gurey

[57] ABSTRACT

An optical limiting amplifier is disclosed having a high gain over a wide dynamic range of input power levels. The amplifier has an input stage (102) and an output stage (103), each of which includes an erbium-doped fiber amplifier (104, 106). The erbium-doped fiber amplifier in the input stage provides a high gain in order to saturate the amplifier in the second stage. The erbium-doped fiber amplifier in the output stage is fabricated with a small core diameter to saturate at reasonably small signal levels, and has a relatively lower total number of erbium ions in order to limit amplification once deep saturation is reached.

5 Claims, 2 Drawing Sheets

HIGH GAIN LIMITING ERBIUM-DOPED FIBER AMPLIFIER WITH WIDE DYNAMIC RANGE

BACKGROUND OF THE INVENTION

This invention relates to optical amplifiers, and more particularly to optical amplifiers which provide a relatively constant optical output power over a wide range of optical input powers.

An optical limiting amplifier (OLA) that has a relatively constant optical output power for a wide range of optical input power variations is required for many practical optical network applications such as optical transmission and distribution networks. For example, OLAs with a large dynamic range can be used as a power amplifier, an in-line amplifier, or a pre-amplifier in a telephone subscriber loop or a long-haul system, where distribution and/or transmission losses vary significantly from location to location. In addition, OLAs can be used to equalize the unequally received optical power from different terminals in an optical switching network.

Prior art optical amplifiers do not have the necessary high power output over a wide operating range needed for these applications. For example, prior art erbium-doped fiber amplifiers (EDFAs) provide only soft limiting of the input power applied to them. Thus, for low input powers the amplifier produces only a small output power. For the applications described above, however, hard limiting is required to achieve a high gain constant output power over a wide range of input powers.

SUMMARY OF THE INVENTION

The optical limiting amplifier of the present invention provides the desired wide dynamic range and relatively constant high output power. This is achieved with a structure comprising two cascaded erbium-doped fiber amplifiers. Neither of the two erbium-doped amplifiers that comprise the OLA of the present invention is individually capable of achieving the desired performance. In cascade, however, these amplifiers provide a relatively constant high power output over the necessary wide range of input powers. The input stage of the OLA structure comprises a conventional erbium-doped fiber amplifier, which provides a very high gain in order to saturate, in the output stage, a second erbium-doped fiber amplifier. The second erbium-doped fiber amplifier, however, is fabricated having both a relatively small core, and a relatively small total number of erbium ions such that the excited ions can all be depleted by the strong stimulated emission caused by the amplified signal from the first-stage amplifier. The small core diameter of the fiber amplifier in the second stage enables it to saturate at a reasonably small input signal level. The small total number of erbium ions limits the maximum power output of the output stage once the amplifier reaches saturation since all excited ions have been depleted. A high output optical power level is thus reached at the output of the second erbium-doped fiber amplifier for small signal levels at the input to the first fiber amplifier, which output power level remains substantially constant as the input power to the OLA increases. The OLA thus achieves the desired substantially constant high output power level over a wide dynamic range of input power levels.

DETAILED DESCRIPTION

Figure 1:
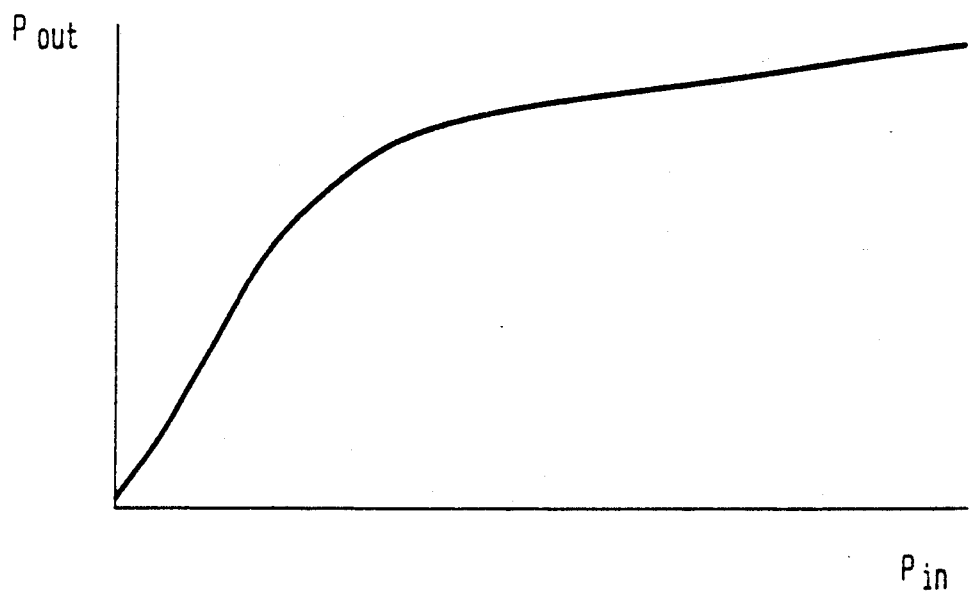
FIG. 1 shows the soft-limiting relationship between input power and output power of a conventional prior art optical amplifier.

FIG. 1 shows the soft limiting relationship between input optical power, $P_{in}$, and output optical power, $P_{out}$, obtainable with a prior art optical amplifier, such as a conventional erbium-doped fiber amplifier. As can be noted, for small input power magnitudes the output power is somewhat linearly related until saturation is achieved. Once saturation is achieved, the output power level continues to slowly increase as the input power level increases, albeit at a much slower rate than before saturation.

Figure 2:
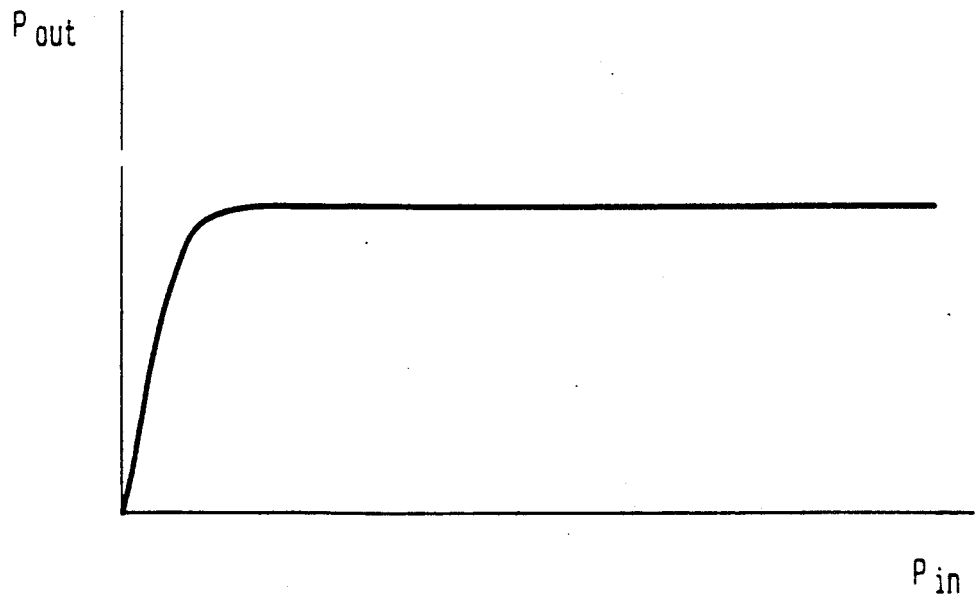
FIG. 2 shows the hard-limiting relationship between input power and output power of an optical limiting amplifier in accordance with the present invention.

An optical power amplifier with an input/output power characteristic such as shown in FIG. 1 would not be satisfactory for use in those optical network distribution and transmission systems as described above, in which distribution/transmission losses vary significantly from location to location. In those types of systems, and in switching networks which receive unequal power from different inputs, optical limiting amplifiers which have a hard-limiting characteristic such as shown in FIG. 2 are required. As noted in FIG. 2, the output power is high and relatively constant over a wide range of input power levels. In these type of systems, and in switching systems which receive unequal power levels from different terminals, an OLA with a hard-limiting input/output power characteristic, such as in FIG. 2, can compensate for these power level differences to produce a known power level at a particular point in the network or system, regardless of the transmission losses that may have affected the signal power level up to that point.

Figure 3:
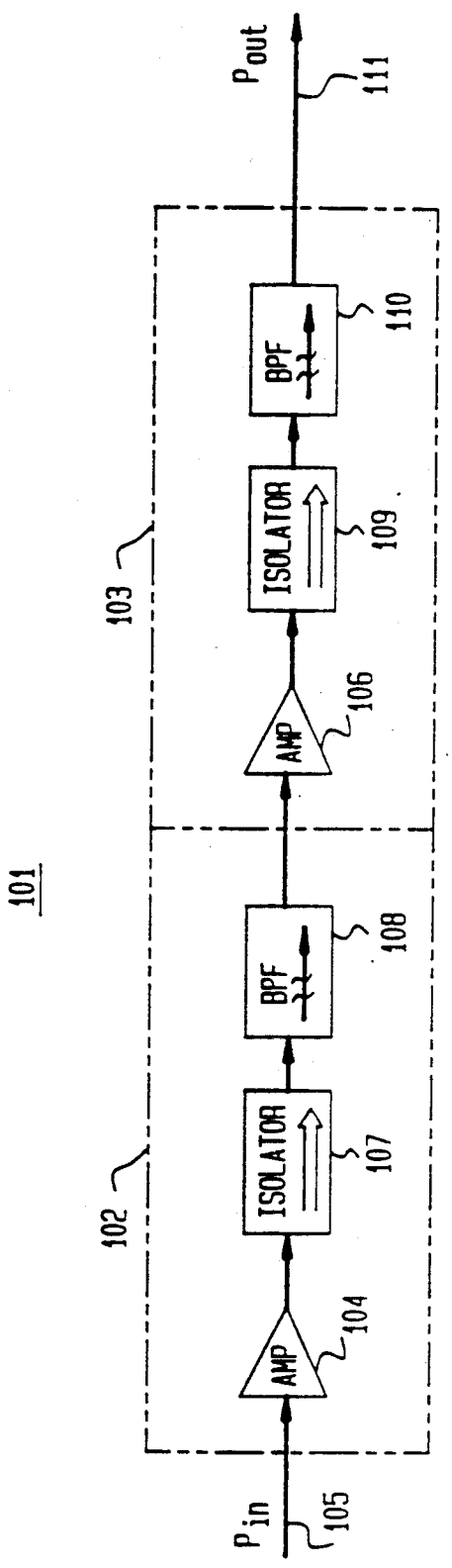
FIG. 3 is a block diagram of the optical limiting amplifier of the present invention.

With reference to FIG. 3, a block diagram is shown of the optical limiting amplifier 101 of the present invention that has the desired hard limiting input/output power characteristic of FIG. 2. OLA 101 consists of a cascaded input stage 102 and output stage 103. In the input stage 102, a conventional erbium-doped fiber amplifier 104 provides a very high gain to amplify the input optical power $P_{in}$ on input fiber 105 to produce a signal of sufficient magnitude to saturate the erbium-doped fiber amplifier 106 in the output stage 103.

The input stage 102 also includes an optical isolator 107, which is connected to the output of optical amplifier 104, and a optical bandpass filter 108, which is connected to the output of isolator 107. Isolator 107 prevents optical reflections from the next succeeding components in the OLA structure from reflecting back to optical amplifier 104 and to prevent multiple reflections. Thus, isolator 107 prevents the amplified spontaneous emission noise of amplifier 106 from being sent back to amplifier 104. Optical bandpass filter 108 functions to eliminate a large portion of the amplified spontaneous emission noise from optical amplifier 104 so that all the gain of the second optical amplifier 106 can be provided to the signal instead of the noise.

The output stage 103 of OLA 101 includes the second erbium-doped fiber amplifier 106, an optical isolator 109, and optical bandpass filter 110. In order to provide a high relatively constant output power over a wide dynamic range of input power levels, the erbium-doped fiber amplifier 106 in the second stage needs to saturate for reasonably small signal levels. Since the saturation power is proportional to the area of the erbium-doped core diameter, fabricating erbium-doped fiber amplifier 106 with a small core diameter enables the fiber amplifier 106 to saturate at a small signal level. For hard-limiting, the output power of fiber amplifier 106 must remain relatively constant once saturation is reached. Therefore, fiber amplifier 106 is fabricated with a relatively low total number of erbium ions. This is achieved by fabricating the fiber amplifier either with a short conventionally doped fiber or with a fiber having a low concentration of erbium ions. With a smaller total number of erbium ions, once deep saturation is achieved no amplifying elements remain for high input signal levels, and continued amplification ceases. Further increases in the input signal level, therefore, produce a constant power level output.

As an example, erbium-doped fiber amplifier 104 in the input stage 102 could by any conventional high gain fiber amplifier structure having typical characteristics such as a core diameter in the range of 4-5 μm, a length in the range of 15-100 m, and an erbium ion concentration in the range of 200-800 ppm. As noted, erbium-doped fiber amplifier 106 in the output stage needs to have a smaller than conventional core diameter and a lower total number of erbium ions. As an example, erbium-doped fiber amplifier 106 could have characteristics such as a core diameter of approximately 3 μm, a length of approximately 12 m, and an erbium ion concentration of 100 ppm. This is equivalent to a product of erbium core area (in $m^2$) × fiber length (in m) × erbium ion concentration (in ppm) of approximately $8.5 \times 10^{-9}$. This product of erbium ion concentration times fiber volume is obviously directly related to the total number of erbium ions in the fiber. More generally, this product should be less than approximately $10^{-8}$. It should be noted that the characteristics of the fiber amplifier 104 in the input stage are not critical as long as high gain is achieved. In fact, the fibers used to fabricate both amplifiers 104 and 106 could be the same if the core diamter is small (for rapid saturation of amplifier 106) and the length of fiber used for amplifier 106 is substantially shorter than the length of fiber used for amplifier 104 (for a reduced number of ions in amplifier 106).

The second stage 103 also includes an optical isolator 109 connected to the output of fiber amplifier 106 and an optical bandpass filter 110 connected to isolator 109. As in the first stage 102, isolator 109 functions to prevent signals from the components connected to the amplifier output fiber 111 from being reflected back to fiber amplifier 106. Bandpass filter 110 eliminates most of the amplified spontaneous emission noise from fiber amplifier 106 so that the performance of a following optical receiver (not shown) or a next stage amplifier will not be affected.

The above-described embodiment is illustrative of the principles of the present invention. Other embodiments can be devised by those skilled in the art without departing from the spirit and scope of the present invention.

I claim:

1. An optical limiting amplifier comprising:
   an input stage comprising a first erbium-doped fiber amplifier; and
   an output stage in cascade with said input stage comprising a second erbium-doped fiber amplifier, the fiber in said second erbium-doped fiber having a fiber core diameter of less than about 4 μm and a product of erbium ion concentration (in ppm) times erbium core area (in $m^2$) times fiber length (in m) of less than about $8.5 \times 10^{-9}$.

2. An optical limiting amplifier in accordance with claim 1 wherein the concentration of erbium ions in the second erbium-doped fiber amplifier is less than about 100 ppm.

3. An optical limiting amplifier in accordance with claim 1 wherein the second erbium-doped fiber amplifier has a length of less than about 12 m.

4. An optical limiting amplifier in accordance with claim 1 wherein said input stage further comprises first optical bandpass filter means for filtering the spontaneous emission noise of the first erbium-doped fiber amplifier, and said output stage further comprises second optical bandpass filter for filtering the spontaneous emission noise of the second erbium-doped fiber amplifier.

5. An optical limiting amplifier in accordance with claim 4 wherein said input stage further comprises first optical isolating means for isolating said first erbium-doped fiber amplifier from optical reflections, and said output stage comprises second optical isolating means for isolating said second erbium-doped fiber amplifier from optical reflections.

* * * * *